No. 832,978. PATENTED OCT. 9, 1906.
J. J. JENSEN.
LAND LEVELER.
APPLICATION FILED FEB. 28, 1905. RENEWED APR. 10, 1906.
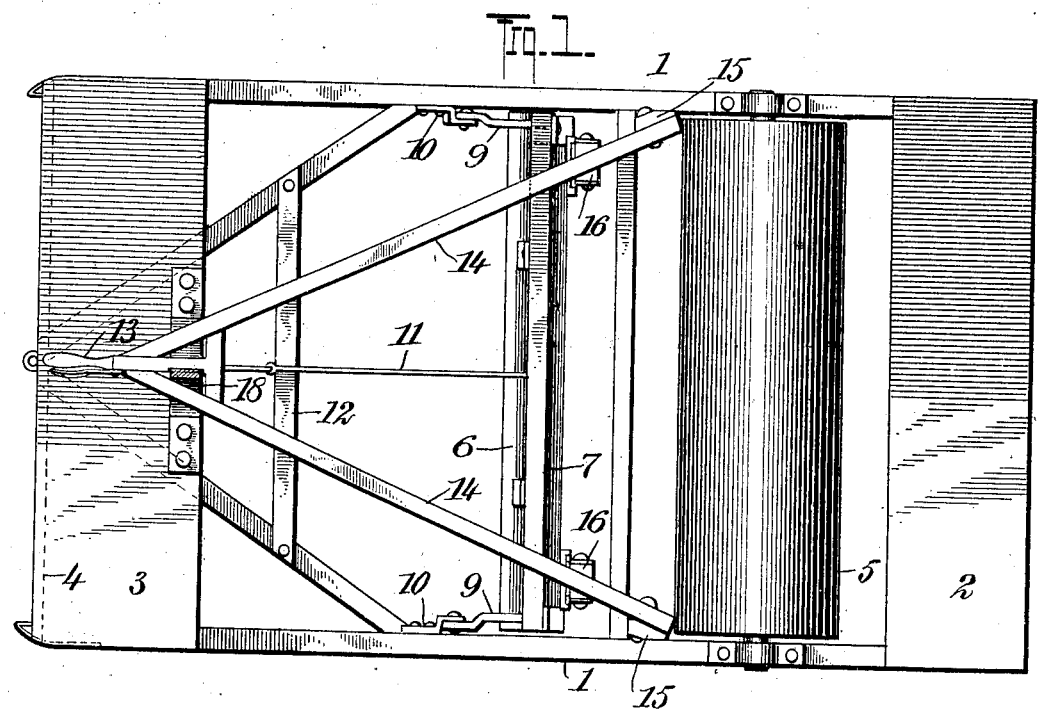
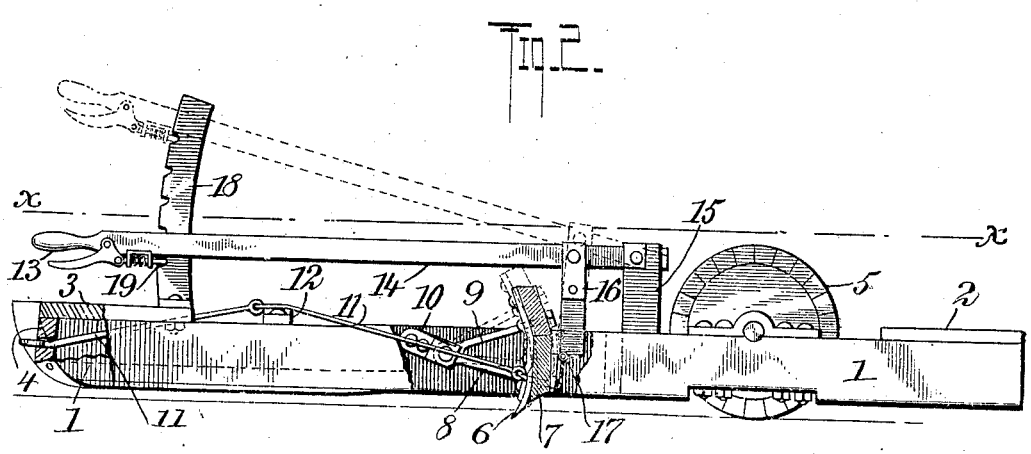
WITNESSES:
INVENTOR
Joseph J. Jensen
BY
ATTORNEYS

UNITED STATES PATENT OFFICE.

JOSEPH J. JENSEN, OF GOSHEN, IDAHO, ASSIGNOR OF ONE-HALF TO CHARLES W. MULHALL, OF IDAHO FALLS, IDAHO.

LAND-LEVELER.

No. 832,978.      Specification of Letters Patent.      Patented Oct. 9, 1906.

Application filed February 28, 1905. Renewed April 10, 1906. Serial No. 310,884.

*To all whom it may concern:*

Be it kuown that I, JOSEPH J. JENSEN, a citizen of the United States, and a resident of Goshen, in the county of Bingham and State of Idaho, have invented a new and Improved Land-Leveler, of which the following is a full, clear, and exact description.

This invention relates to improvements in machines for leveling ground or land and making roads, lawns, and the like, the object being to provide a leveler of simple and novel construction which may be easily manipulated to scrape the dirt from high places and dump the same in low places.

I will describe a land-leveler embodying my invention and then point out the novel features in the appended claims.

Reference is to be had to the accompanying drawings, forming a part of this specification, in which similar characters of reference indicate corresponding parts in both the figures.

Figure 1 is a plan, partly in section, on the line *x x* of Fig. 2, of a land-leveler embodying my invention; and Fig. 2 is a side view thereof, partly in section.

The device comprises a frame having side bars 1, connected at the rear end by a platform 2, and a platform 3 extends across the front end. The front ends are also connected by means of a cross-bar 4. The frame is supported slightly above the ground by means of a roller 5. This roller not only serves to support the device, but acts to press or roll the ground. or dirt dumped in low places. The roller also carries the entire weight of the device, thereby lessening the draft and also compressing the earth, closing the pores and preventing evaporation from humid soil. Forward of the roller and extended transversely of the frame is a scraper 6. This scraper is mounted on a bar 7, connected to the ends of which are arms, each arm consisting of divergent members 8 9, these arms being pivoted to brackets 10, attached to the side members 1 of the frame. Extended from the bar 7 is a brace-rod 11, the connection of said rod with the bar being below the pivotal point of the bar. This rod is made in two sections, one section extending over and bearing upon a cross-bar 12, and the end of the other section passing loosely through an opening in the front bar 4.

An operating-lever 13 has divergent members 14, which are mounted to swing on posts 15, extended upward from the side members of the frame. These divergent members 14 have link connections 16 with the rear side of the bar 7, these links being pivotally connected to said divergent members and having hinge connections 17 with said bar. By means of the lever 13 the operator can scrape or level from one to four inches of soil.

Extended upward from the platform 3 is a segment-rack 18, designed to be engaged by a spring-pressed pawl 19, carried by the lever 13.

In the operation as the machine is drawn forward and upon reaching an elevated portion from which the dirt is to be removed the scraper is to be forced downward by means of the lever 13 and locked into engagement with the rack 18. After passing over the raised portion the dirt may be dumped by releasing the lever from the rack and raising said lever. This lifting of the lever by drawing upon the links 16 will rock the scraper upward, as indicated by dotted lines in Fig. 2.

Having thus described my invention, I claim as new and desire to secure by Letters Patent—

1. In a land-leveler, a roller-mounted frame, a bar extended transversely in the frame, a scraper-plate on the lower edge of said bar, arms extended forward from the bar and having swinging connection with the side members of the frame, a lever having divergent members having swinging connection with the frame, link connections between said divergent members and said bar, and means for locking the lever in its adjusted position.

2. In a land-leveler, a frame comprising side members and having a front bar provided with an opening, a scraper extended transversely in the frame and mounted to swing vertically, a rod extended from said scraper loosely through said opening, a lever having divergent members, posts extended upward from the side members of the frame rearward of the scraper and to which said divergent members are pivoted, link connections between said divergent members and the scraper, and a supporting-roller for the frame rearward of the scraper.

In testimony whereof I have signed my name to this specification in the presence of two subscribing witnesses.

JOSEPH J. JENSEN.

Witnesses:
    J. O. LOWDER,
    C. W. MULHALL.